United States Patent
Lao

(10) Patent No.: US 11,015,807 B2
(45) Date of Patent: May 25, 2021

(54) COMBUSTOR HEAT SHIELD COOLING

(71) Applicant: PRATT & WHITNEY CANADA CORP., Longueuil (CA)

(72) Inventor: Si-Man Amy Lao, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 97 days.

(21) Appl. No.: 16/262,231

(22) Filed: Jan. 30, 2019

(65) Prior Publication Data
US 2020/0240640 A1   Jul. 30, 2020

(51) Int. Cl.
| F23R 3/00 | (2006.01) |
| F02C 6/08 | (2006.01) |
| F02C 7/18 | (2006.01) |

(52) U.S. Cl.
CPC ............... *F23R 3/005* (2013.01); *F02C 6/08* (2013.01); *F02C 7/18* (2013.01); *F23R 3/002* (2013.01); *F23R 2900/03043* (2013.01)

(58) Field of Classification Search
CPC ........ F23R 2900/03041–5; F23R 3/002; F23R 3/005; F23R 3/02; F23R 3/50; F05D 2240/35
See application file for complete search history.

(56) References Cited

U.S. PATENT DOCUMENTS

| 4,315,406 | A  | * | 2/1982  | Bhangu ................. | F23R 3/002 |
|           |    |   |         |                         | 428/137    |
| 7,093,439 | B2 | * | 8/2006  | Pacheco-Tougas .....     | F23R 3/002 |
|           |    |   |         |                         | 60/752     |
| 8,167,558 | B2 | * | 5/2012  | Liang ....................... | F01D 5/187 |
|           |    |   |         |                         | 415/115    |
| 8,745,988 | B2 | * | 6/2014  | Verhiel ................... | F23R 3/007 |
|           |    |   |         |                         | 60/752     |
| 9,074,771 | B2 | * | 7/2015  | Bottcher ................ | F23R 3/002 |
| 9,939,154 | B2 | * | 4/2018  | Cunha ..................... | F23R 3/002 |
| 10,047,958 | B2 |  | 8/2018 | Erbas-Sen et al. | |
| 10,088,161 | B2 |  | 10/2018 | Drake et al. | |
| 10,094,563 | B2 |  | 10/2018 | Cunha et al. | |
| 2014/0216042 | A1 | * | 8/2014 | Hanson ................... | F23R 3/06 |
|           |    |   |         |                         | 60/754 |
| 2018/0266686 | A1 |  | 9/2018 | Zelesky et al. | |

\* cited by examiner

*Primary Examiner* — Alain Chau
*Assistant Examiner* — Sean V Meiller
(74) *Attorney, Agent, or Firm* — Norton Rose Fulbright Canada LLP

(57) ABSTRACT

A combustor heat shield comprises a panel body having a front surface and a back surface. The back surface has sealing rails extending therefrom and defining a serpentine cooling path on the back surface of the panel body.

14 Claims, 3 Drawing Sheets

COMBUSTOR HEAT SHIELD COOLING

TECHNICAL FIELD

The application relates generally to gas turbine engines and, more particularly, to cooling of combustor heat shields.

BACKGROUND OF THE ART

Gas turbine combustors are the subject of continual improvement, to provide better cooling, better mixing, better fuel efficiency, better performance, etc. at a lower cost. For example, heat shields are known to provide better protection to the combustor, but heat shields also require cooling. The amount of cooling air available for cooling the heat shields must be minimized to improve the combustion efficiency and to reduce smoke, unburned hydrocarbon and CO/NOx emission. Efficient use of cooling air is, thus, desirable.

SUMMARY

In one aspect, there is provided a combustor heat shield for a gas turbine engine, the combustor heat shield comprising: a panel body having a front surface and a back surface; and sealing rails extending from the back surface, the sealing rails arranged to co-operatingly define a serpentine cooling circuit along the back surface of the panel body.

In another aspect, there is provided a combustor of a gas turbine engine, the combustor comprising: a combustor liner defining a combustion chamber; a heat shield secured to the combustor liner inside the combustion chamber, the heat shield comprising a panel body having a front surface oriented internally relative to the combustion chamber and a back surface oriented toward the combustor liner; an air gap between the combustor liner and the panel body of the heat shield; and sealing rails extending across the air gap, the sealing rails arranged to define a labyrinth sealing structure.

In a further aspect, there is provided a method for cooling a heat shield panel of a gas turbine engine combustor, the heat shield panel having a back surface, the method comprising: guiding a coolant flow between sealing rails arranged in a tortuous path on the back surface of the heat shield panel.

DESCRIPTION OF THE DRAWINGS

Reference is now made to the accompanying figures in which.

DETAILED DESCRIPTION

Figure 1:
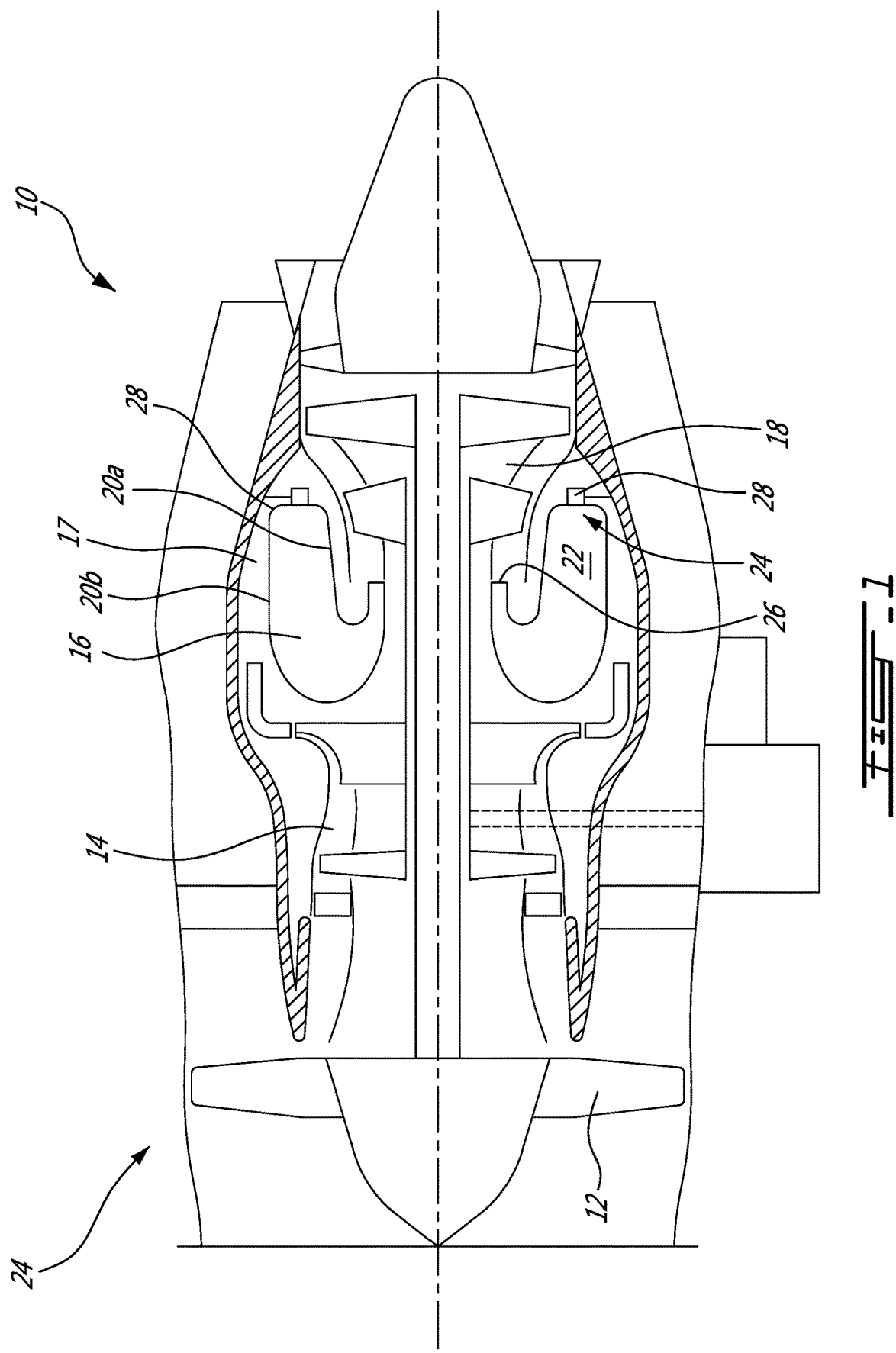
FIG. 1 is a schematic cross-section view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor 14. As shown in FIG. 1, the combustor 16 may, for instance, comprise a reverse flow annular combustor shell including a radially inner liner 20a and a radially outer liner 20b, extending from a dome or bulkhead 24 and defining therewith a combustion chamber 22. The combustor 16 further has an exit portion 26 for communicating combustion gases with the turbine section 18. Circumferentially distributed fuel nozzles 28 extend through the dome 24 of the combustor 16 to deliver a fuel-air mixture to the combustion chamber 22.

Figure 2:
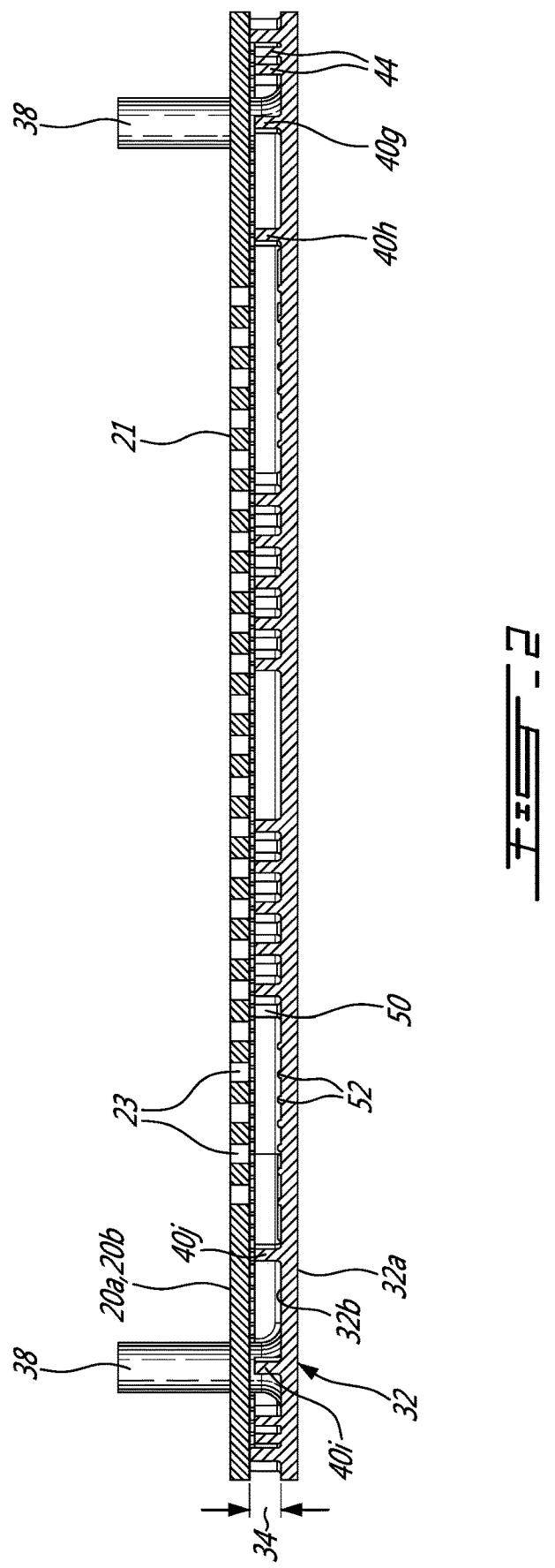
FIG. 2 is a cross-section view illustrating a combustor heat shield mounted to the combustor shell of the combustor.

As can be appreciated from FIG. 2, the inner surface of the combustor liners 20a, 20b is lined with segmented heat shields that protect the combustor liners from direct exposure to hot combustion gases. Double or multi-skinned combustor walls are typically designed with minimal mechanical coupling. The main purpose is to minimize stresses due to differential thermal expansion between inner (hot) and outer (cool) layers; the walls are allowed to have a certain degree of "float" to shift and relieve itself. Such float walls (herein referred to as heat shields) are also limited in overall size as thermal gradients tangent to the surface of the inner (hot) skin will generate its own set of stresses. Due to these limitations, heat shields on the hot side are split into many segments and separately assembled onto a structural "shell" (liners 20a, 20b), which is also known as the cold skin.

Figure 3:
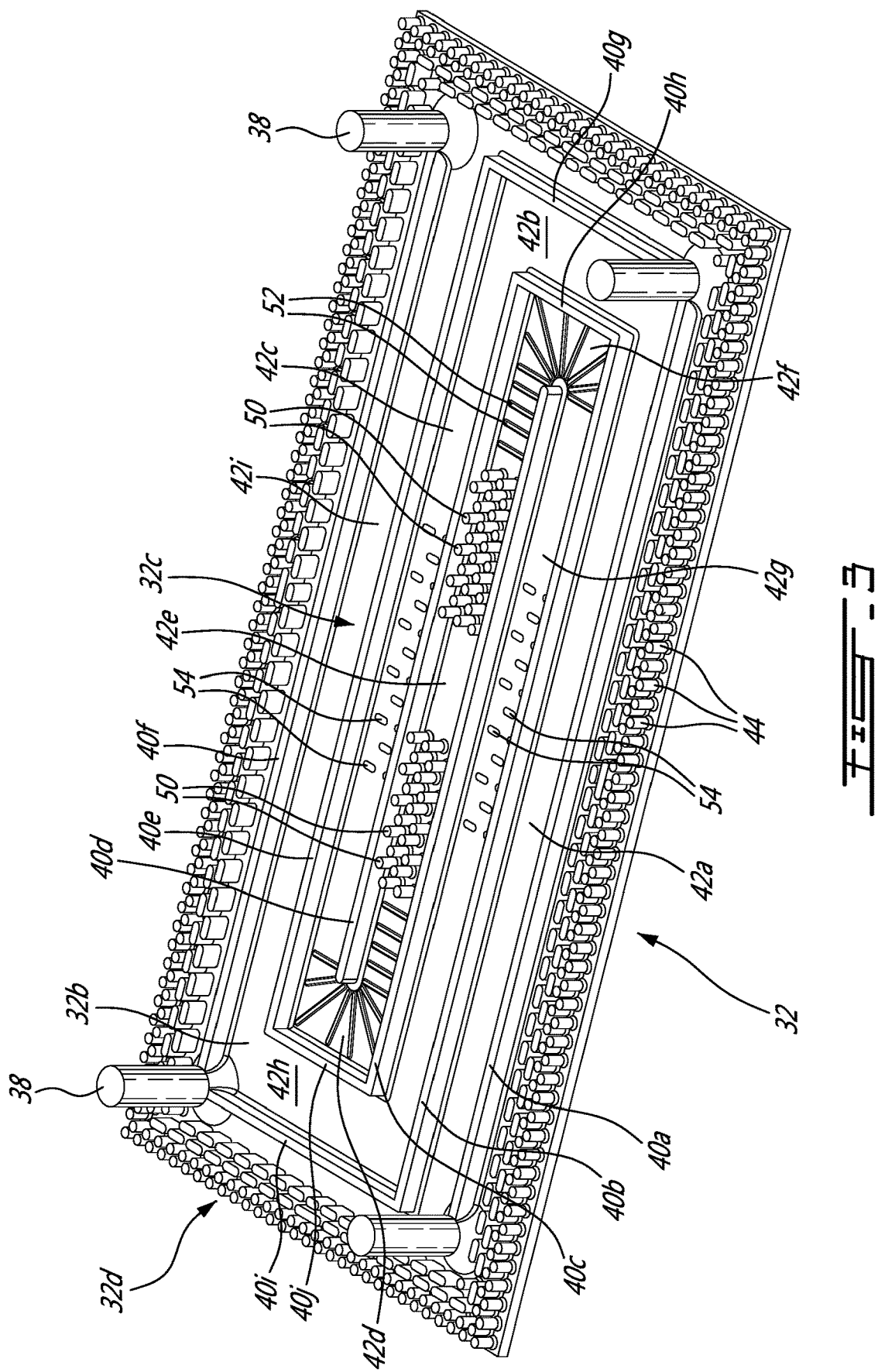
FIG. 3 is an isometric view of the combustor heat shield panel.

The heat shields each have a panel body 32 having a front surface 32a and a back surface 32b. The front surface 32a is relatively smooth and continuous and is oriented internally relative to the combustion chamber 22 (i.e. it faces the combustion zone). The back surface 32b faces the inner surface 21 of the combustor liners 20a, 20b. More particularly, the heat shield panels are mounted to the combustor liners 20a, 20b with the back surface 32b of the heat shield panels in closed facing, spaced-apart, relationship with the inner surface 21 of the combustor liners 20a, 20b. To that end, each heat shield panel 32 may be provided on the back surface 32b thereof with a number of studs 38 for extending through corresponding mounting holes defined in the combustor liners 20a, 20b. Nuts (not shown) are screwed or threadably engaged on a threaded distal end portion of each stud 38 outwardly of the combustor shell to securely hold the heat shield panels 32 in position on the inner surface 21 of the combustor liners 20a, 20b. As shown in FIG. 3, one stud 38 may be provided in each corner region of the heat shield panel. However, it is understood that studs may be provided in various locations (e.g. corners, mid-panel, mid-edge) as per different heat shield sizes.

Referring back to FIG. 2, it can be appreciated that the back surface 32b of the heat shield panels and the inner surface 21 of the combustor liners 20a, 20b define an air gap 34 for receiving cooling air to cool down the heat shields 32. Cooling holes, such as impingement holes 23, are defined in the combustor liners 20a, 20b for directing air from the plenum 17 into the air gap 34. As will be seen hereinafter, the flow of air in air gap 34 (i.e. the flow on the back side of the heat shield panels) is controlled to effectively cool the various regions of the heat shield panels.

FIG. 3 illustrates one example of a heat shield panel 32. The back surface 32b of the exemplary heat shield panel 32 comprises two distinct zones or areas: 1) a central area 32c and 2) a perimeter band 32d circumscribing the central area 32c. According to this particular embodiment, the posts 38 extend from the corners of the central area 32c. That is the corner posts 38 are disposed inwardly from the perimeter band 32d.

Sealing rails are typically provided at the perimeter of the back surface 32b of each heat shield panel to prevent cooling air from escaping uncontrollably into the combustion chamber. However, such features often fail to create enough sealing to accommodate highly effective cooling schemes which utilize very little flow. As will be seen hereinafter, the central area 32c and the surrounding perimeter band 32d of heat shield panel 32 have respective sealing structures to offer resistance to fluid flow in the air gap 34 from the central region to the periphery of the heat shield panel 32.

The perimeter band 32d can, for instance, be configured as described in U.S. patent application Ser. No. 15/926,368 filed on Mar. 20, 2018, the entire content of which is hereby incorporated by reference. More particularly, the perimeter band 32d on the back side 32b of the combustor heat shield panel 32 may be provided with turbulators 44 for effectively controlling cooling air escaping from the sides of the heat shield panel 32. The turbulators 44 are arranged in arrays of multiple turbulators distributed over the perimeter band 32d on all sides of the heat shield panel 32. More particularly, the turbulators 44, forming the perimeter band 32d, are configured to act as high delta pressure (ΔP) cooling features around the rim of the heat shield panel 32, replacing conventional side-rails, to generate additional heat removal from the escaping air. staggered rows of turbulators 44 can be used to generally match (or throttle) the ΔP across the rails/walls that they replace such that the overall aerodynamic performance is not affected. That is the turbulators 44 can be configured and arranged to create a desired pressure drop to control and restrict the amount of cooling air escaping from the sides of the heat shield panel 32 just as a conventional sealing rail would do. But in addition of controlling the amount of air leaking from the heat shield sides, the turbulators 44 promote heat transfer across the perimeter band 32d up to the rail-less contour of the heat shield panel 32, thereby providing for a further utilization of the leakage air that is normally lost by the heat shield side-rails.

The turbulators 44 can be provided in the form of staggered arrays of projections comprising rows of regularly spaced-apart projections, each row offset from the adjacent rows such as to define tortuous paths across the perimeter band 32d all the way to the rail-less contour or edge of the heat shield panel 32 (the outermost row of projections still promote turbulence). Such an arrangement of staggered turbulators 44 force the air to navigate through various turns as it flows across the perimeter band 32d toward the border or edge of the heat shield panel 32. This promotes turbulence in the cooling air escaping from the rail-less contour of the heat shield panels and, thus, provides for enhanced heat transfer directly at the edges of the heat shield panel 32.

The turbulators 44 can adopt various forms. For instance, the turbulators 44 can include pin, pin fins, pedestals, ribs, flow restrictor walls with holes etc. Also, the turbulators can have various cross-sectional shapes. For instance, cylindrical turbulators or rectangular turbulators could be provided. Also the turbulators may have different heights. As a further example, the turbulators could comprise full height pin fins (pin fins extending completely across air gap 34) and/or partial height pin fins. The turbulators 44 of a given row can be identical or different.

According to another embodiment, the sealing structure of the perimeter band 32d could comprise conventional sealing rails extending along the edges of each heat shield panel 32. The peripheral rails could be provided in addition to or in lieu of the turbulators 44. Other suitable peripheral sealing structures are contemplated as well.

As shown in FIG. 3, the sealing structure of the central area 32c includes a flow partitioning arrangement of sealing rails 40a, 40b . . . 40i, 40j configured to partition the cooling flow in the air gap 34 and encourage it to follow a tortuous/swirling path between the combustor liners 20a, 20b and the heat shield panel 32. When multiples of such paths are used, arranged in a periodic manner, cooling air leaking over the sealing rails 40a, 40b . . . 40i, 40j from one cooling passage end up in an adjacent cooling passage across a significantly reduced pressure drop compared to directly leaking into the combustion chamber. Indeed, a seal which divides a lower pressure drop results in less leakage flow when compared to the same seal being subjected to a higher pressure drop. As such, according to the embodiment shown in FIG. 3, even the leaked air continues to cool the heat shield panel 32 by continuing its path via the adjacent cooling passage formed by the arrangement of sealing rails 40a, 40b . . . 40i, 40j on the back surface 32b of the heat shield panel 32.

In the particular embodiment shown in FIG. 3, the sealing rails 40a, 40b . . . 40i, 40j in the central area 32c are arranged so as to form a labyrinth seal including a succession of spaced-apart longitudinal sealing rails (40a, 40b, 40c, 40d, 40e, 40f) and a succession of spaced-apart lateral sealing rails (40g, 40h, 40i, 40j) in directions transversal to the longitudinal and lateral sides of the heat shield panel 32, respectively. Accordingly, the cooling air leakage from the central area 32c of the heat shield panel 32 has to flow over a succession of sealing rails before escaping from the periphery of the panel.

As shown in FIG. 3, the sealing rails 40a, 40b . . . 40i, 40j may be arranged to define a serpentine cooling circuit for directing the flow of cooling air in the air gap 34 between the combustor liner 20a, 20b and each heat shield panel 32. The exemplary serpentine cooling circuit shown in FIG. 3 comprises a first longitudinal leg 42a extending along a first longitudinal side of the heat shield panel 32. The first longitudinal leg 42a of the serpentine cooling conduit is defined between laterally spaced-part longitudinal rails 40a and 40b. The first longitudinal leg 42a is fluidly connected to a second parallel longitudinal leg 42c via a first lateral leg 42b extending parallel to a first lateral side of the panel 32. The first lateral leg 42b is defined between longitudinally spaced-apart lateral rails 40g and 40h. The second longitudinal leg 42c is defined between laterally spaced-apart longitudinal rails 40d and 40e. The second longitudinal leg 42c is fluidly connected to a third longitudinal leg 42e via a second lateral leg 42d. The second lateral leg 42d is externally bordered by lateral rail 40j extending between longitudinal rails 40c and 40e. The third longitudinal leg 42e is defined between longitudinal rails 40c, 40d. The third longitudinal leg 42e is fluidly connected to a fourth longitudinal leg 42g via a third lateral leg 42f. The third lateral leg 42f is externally bordered by lateral rail 40h. The fourth longitudinal leg 42g is defined between longitudinal rails 40b and 40c. The fourth longitudinal leg 42g is fluidly connected to a fifth longitudinal leg 42i via a fourth lateral leg 42h. The fourth lateral leg 42h is defined between lateral rails 40i, 40j. The fourth lateral leg extends along a second lateral side of the panel opposite the first lateral side thereof. The fifth longitudinal leg 42i extends along a second longitudinal side of the panel 32 opposite to the first longitudinal side thereof. The fifth longitudinal leg 42i is defined between longitudinal rails 40e and 40f.

The serpentine cooling circuit extends along a tortuous path from a first open end at a free distal end of the first longitudinal leg 42a to a second open end at a free distal end of the fifth longitudinal leg 42i. Accordingly, the cooling air flowing out from the serpentine cooling circuit via the open ends thereof is directed in opposed directions towards the opposed lateral sides of perimeter band 32d where additional heat is extracted as the cooling air flows through turbulators 44. It is understood that the open ends of the cooling circuit could alternatively be oriented toward the longitudinal sides of the panel. Any portion of the cooling air in the serpentine cooling circuit leaking over the sealing rails 40a . . . 40j from one leg of the circuit to the next will escape the panel via both the longitudinal and lateral sides of the peripheral band 32d of turbulators 44. The overall effect is that the swirling configuration of the serpentine cooling circuit naturally reduces the impact of ineffective sealing at the heat shield edges. Multiple benefits can be reaped from this swirling passage configuration. The first being an overall cooling effectiveness increase by guiding the air through a longer path without increasing the total size of the heat shield panel; giving the working fluid more time to extract heat. By partitioning the cooling air into more discrete paths, the designer can ensure that only the hottest (spent) air be dumped into the combustion chamber. It can thus be appreciated that the features of at least some of the embodiments allow improving cooling effectiveness in a multi-skinned combustion liner arrangement.

As shown in FIG. 3, various heat transfer augmenters can be provided in the cooling circuit between the opposed open ends thereof. For instance, pin fins 50, trip strips 52, chevrons (not shown), effusion holes (54), and impingement holes (not shown) can be added to further enhance heat extraction and control pressure distribution. It is noted that the sealing rails themselves also act as cooling fins. The spent cooling flow, if not exhausted through the effusion holes 54 extending from the back surface 32b to the front surface 32a of the heat shield panel 32, can exit through the edges of the combustor heat shield panel to be used for purging or filming on the hot side. If a very steep swirl angle is used for the sealing rails, then any cooling flow attempting to leak from the centre of the pattern towards the outer edge will need to cross multiple seals as opposed to just one.

Impingement cooling via impingement holes 23 in the combustor liner can be applied anywhere on the back surface of the heat shield panel with favourable conditions (sufficient pressure drop, low cross flow, optimal jet height, etc.). Effusion holes and other cooling features can be used to create such conditions for effective impingement.

The highest amount of heat extraction is expected to be near the centre of the swirl, decreasing outwards. The corresponding metal temperature contour may result in a more damage tolerant component since the heat shield will likely burn from the edges inwards as opposed to the centre outwards. As the heat shield degrades in this manner, most of the sealing is maintained.

It is understood that the serpentine cooling circuit could have a different numbers of legs provided it defines a tortuous path over the back surface 32b of the heat shield panel 32. Also, the serpentine passage could have other configurations. For instance, the serpentine circuit could define a winding or swirling path over the back surface of the heat shield panel 32. Fractions of a swirl pattern may be used instead of a whole 360° to accommodate shape and size limitations or be used create localized cooling channels near edges, corners, around studs, around dilution holes, or any other specialized features. The swirl many take on various overall shapes, such as circles, squares, rectangles, and triangles. The overall pattern itself may not be a swirl and can take the form of multiple discrete cooling passages, winding behind the heat shield panel.

It is also understood that the partitioning of the central area can be used without the use of additional pin fins or peripheral rails around the outer edge of the heat shield panel. That is according to some application, turbulators 44 and/or peripheral sealing rails may not be required in addition to the sealing rails of the central 32c. For instance, the serpentine cooling circuit could cover all the surface area of the panel up to the outer edges thereof.

The heat shield panel 32 can be integrally made with all its details via investment casting, metal injection molding (MIM), 3D printing, fabrication, lamination, machining or any other means of shaping metal.

The above description is meant to be exemplary only, and one skilled in the art will recognize that changes may be made to the embodiments described without departing from the scope of the invention disclosed. For example, while the principles of the present invention have been described in the context of combustor liner heat shields, it is understood that similar principles could be applied to combustor dome heat shields. Also the internal rails 40a, 40b . . . 40i, 40j can be a separate part, sandwiched between the heat shield and the combustor shell. Still other modifications which fall within the scope of the present invention will be apparent to those skilled in the art, in light of a review of this disclosure, and such modifications are intended to fall within the appended claims.

The invention claimed is:

1. A combustor heat shield for a gas turbine engine, the combustor heat shield comprising: a panel body having a front surface and a back surface; and sealing rails extending from the back surface, the sealing rails arranged to cooperatingly cooperatively define a serpentine cooling circuit along the back surface of the panel body, wherein the serpentine cooling circuit is surrounded by a peripheral band, the peripheral band including turbulators arranged in arrays of multiple turbulators distributed over the peripheral band on all sides of the panel body, the arrays of turbulators encircling all of the sealing rails.

2. The combustor heat shield of claim 1, wherein the panel body has longitudinal sides and lateral sides, and wherein the sealing rails include a succession of sealing rails spaced-apart in a direction transversal to the longitudinal sides and the lateral sides, thereby forming a labyrinth sealing structure on the back surface of the panel body.

3. The combustor heat shield of claim 1, wherein the serpentine cooling circuit extends from a central region of the back surface to a peripheral region of the back surface.

4. The combustor heat shield of claim 1, wherein heat transfer augmenters are provided on the back surface of the panel body along the serpentine cooling circuit.

5. A combustor of a gas turbine engine, the combustor comprising; a combustor liner defining a combustion chamber; a heat shield secured to the combustor liner inside the combustion chamber, the heat shield comprising a panel body having a front surface oriented internally relative to the combustion chamber and a back surface oriented toward the combustor liner; an aft gap between the combustor liner and the panel body of the heat shield; and sealing rails extending across the air gap, the sealing rails arranged to collectively define a labyrinth seal from a central area of the back surface of the panel body to a peripheral area thereof, wherein the peripheral area includes turbulators arranged in arrays of multiple turbulators distributed over the peripheral area on all sides of the panel body, the arrays of turbulators surrounding all the sealing rails.

6. The combustor of claim 5, wherein the labyrinth seal is configured to offer resistance to fluid flow from the central area to the peripheral area.

7. The combustor of claim 6, wherein the sealing rails defining the labyrinth seal comprise a succession of sealing rails distributed in a direction transverse to a side of the panel body.

8. The combustor of claim 5, wherein the sealing rails define a tortuous path including longitudinal legs extending along a longitudinal axis of the panel body and fluidly interconnected via lateral legs extending along a lateral axis of the panel body.

9. The combustor of claim 5, wherein heat transfer augmenters are provided between adjacent ones of the sealing rails.

10. The combustor of claim 5, wherein the sealing rails define a serpentine cooling circuit on the back surface of the panel body.

11. A method for cooling a heat shield panel of a gas turbine engine combustor, the heat shield panel having a back surface, the method comprising: cooling a central area of the heat shield panel by guiding a coolant flow between sealing rails arranged in a tortuous path on the back surface of the heat shield panel; and cooling a peripheral area of the heat shield panel by causing the coolant to flow through arrays of turbulators encircling the tortuous path of the central area of the heat shield panel; the arrays of turbulators distributed on all sides of the heat shield panel and surrounding all of the sealing rails.

12. The method of claim 11, comprising offering resistance to the coolant flow from a central region of the back surface of the heat shield panel to a peripheral region thereof by causing coolant leaking over the sealing rails from one segment of the tortuous path to end up in an adjacent segment.

13. The method of claim 11, wherein guiding comprises causing the coolant flow to follow a swirl pattern on the back surface of the heat shield panel.

14. The method of claim 11, further comprising generating turbulences in the coolant flow along the tortuous path.

* * * * *